Dec. 10, 1968  U. MERTEN ETAL  3,415,038
METHOD AND APPARATUS FOR GAS SEPARATION BY DIFFUSION
Filed June 23, 1966
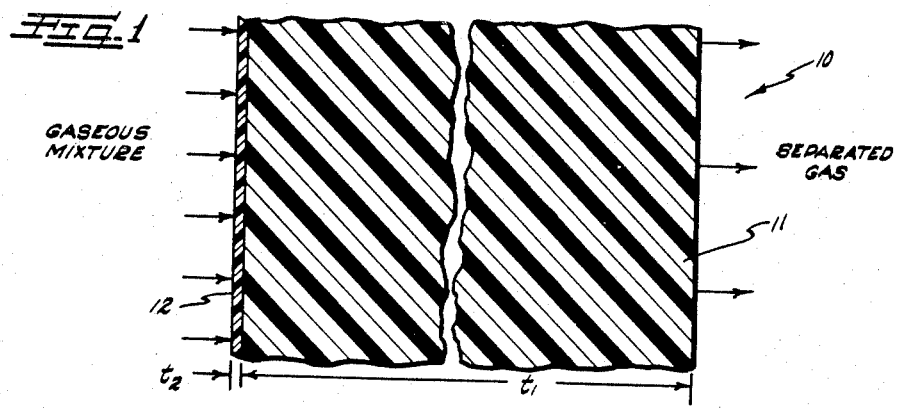
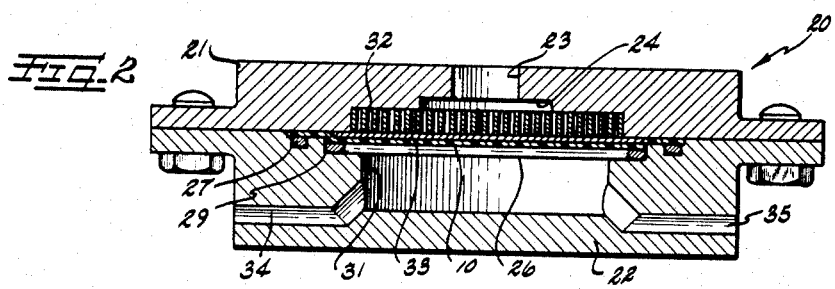
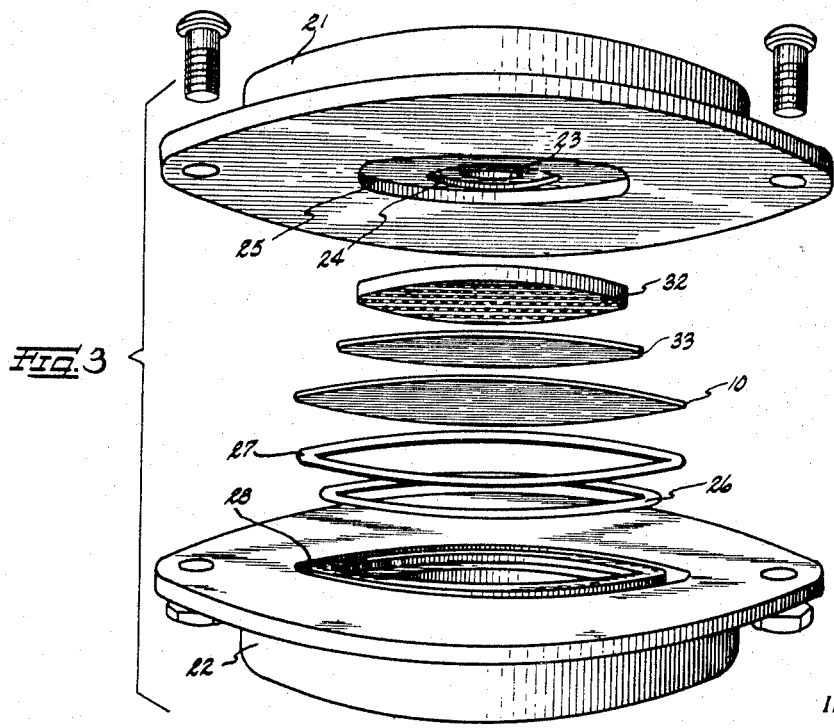
INVENTORS
ULRICH MERTEN
PETER K. GANTZEL
ATTORNEYS United States Patent Office 3,415,038
Patented Dec. 10, 1968

3,415,038
METHOD AND APPARATUS FOR GAS
SEPARATION BY DIFFUSION
Ulrich Merten, Solana Beach, and Peter K. Gantzel, San Diego, Calif., assignors, by mesne assignments, to Gulf General Atomic Incorporated, San Diego, Calif., a corporation of Delaware
Filed June 23, 1966, Ser. No. 559,823
17 Claims. (Cl. 55—16)

ABSTRACT OF THE DISCLOSURE

Method and apparatus for gas separating using dry cellulose acetate membranes having a relatively thick porous layer which backs and supports a thin selectively permeable layer. The gas mixture is applied to the surface of the thin layer under suitable pressure and at room temperature. Helium can be very effectively separated from various gas mixtures, hydrogen from carbon monoxide and oxygen from nitrogen.

---

This invention relates to the separation of gases in gaseous mixtures and, more particularly, to gaseous separation which is effected by selective diffusion of gases through nonporous membranes.

A known process for separating gases in gaseous mixtures involves the use of a flow barrier, such as a membrane, which offers different degrees of resistance to the diffusion of different gases through the membrane. A particular gas may be separated from a gaseous mixture by utilizing a membrane through which the particular gas will diffuse at a substantially higher rate than the other gases in the mixture. Thus, the diffusion characteristics of the membrane are such that the membrane is capable of selecting the particular gas out of a mixture of gases.

Two types of membranes which have been utilized in gaseous diffusion processes are porous membranes and nonporous membranes. In porous membranes, selective diffusion occurs because the heavier molecules in a gaseous mixture have a slower average velocity than the lighter molecules. If the mean free path of the gas molecules is large compared with the diameter of the pores in the porous membrane, the lighter molecules will tend to pass the membrane barrier whereas the heavier molecules will tend to be confined by it. Diffusion through nonporous membranes, on the other hand, involves a complex transport process between the two sides of the membrane. The gas dissolves in the solid membrane at one surface, and diffuses through the membrane to the opposite surface, from where it evaporates.

With respect to nonporous membranes, the diffusion rate of a particular gas under a given set of operating conditions depends upon the permeability of the gas in the particular nonporous membrane material. This permeability is measured by a permeability constant and, at a given temperature, a particular membrane material will possess different permeability constants for different gases. Thus, the membrane material selected should be such as to possess a relatively high permeability constant for the gas or gases which are to be separated from the mixture by diffusion. Collection may be made, depending upon needs, of either or both the diffused gas or gases on one side of the membrane, and the resultant mixture minus the diffused gas or gases on the other side of the membrane.

A nonporous membrane, if it is to efficiently operate to separate a particular gas or gases from a mixture of gases containing the particular gas or gases, should have certain properties in addition to possessing a relatively high permeability constant for the particular gas or gases. Among these are that the absolute diffusion rate of the particular gas or gases through the membrane should be sufficiently high as to produce satisfactory quantities of separated gas within a reasonable time, depending on specific needs and economics. Furthermore, the membrane should exhibit physical stability at the particular operating temperatures and pressures which are used. It may also be desirable for the membrane to be chemically inert to the gases with which it is in contact. Finally, the membrane should be substantially free of defects, such as pinholes, which would permit the gaseous mixture to pass through the membrane and defeat the purpose of the diffusion process.

Gaseous diffusion techniques may possibly be of use in connection with a number of commercial applications of gas separation. For example, helium may be separated from natural gas through the use of gaseous diffusion, rather than the cryogenic techniques which are now utilized commercially to obtain helium. Another possible commercial application would be in connection with the separation of neon from a mixture of helium and neon. A by-product of coking and similar processes is a gaseous mixture of hydrogen and carbon monoxide. It may be desirable to recover the hydrogen from such mixture, and gaseous diffusion is a commercially possible technique. It will be apparent that there are other possible applications of gaseous diffusion techniques in the separation of gases for commercial purposes.

Various techniques have been attempted for separating helium from natural gas, and for separating a variety of other gases from gaseous mixtures. Some instances of success exist, however, many have been unsuccessful, particularly from a commercial standpoint.

In connection with the recovery of helium from natural gas, an article by Stern et al., "Helium Recovery by Permeation," Industrial and Engineering Chemistry, volume 57, No. 2, February 1965, discloses the use of Teflon FEP membranes. Unfortunately, the permeation rates of helium in such membranes are not commercially practicable unless the operating temperature is increased substantially above room temperature. This adds considerable expense to the system proposed. Silica glass membranes have been utilized in connection with helium recovery. Unfortunately, such glass membranes, due to their brittle nature, must be constructed in complex capillary tube arrangements, raising their cost and resulting in a significant pressure drop through the system. In addition, practical diffusion rates through silica glass are not obtained unless the process is carried out at substantially elevated temperatures.

It is an object of this invention to provide a method and apparatus for separation of gases which is susceptible of operation on a commercial scale in connection with various types of gases which are relatively difficult or expensive to separate by known techniques.

Another object of the invention is to provide an improved method and apparatus for separating gases by selective diffusion.

Still another object of the invention is to provide an improved method and apparatus for separating helium from natural gas or other gaseous mixtures having the same or similar constituents.

A further object of the invention is to provide an improved method and apparatus for separating hydrogen from a mixture of hydrogen and carbon monoxide.

A still further object of the invention is to provide an improved method and apparatus for separating neon from a mixture of neon and helium.

Other objects and the various advantages of the invention will become apparent to those skilled in the art from the following description taken in connection with the accompanying drawing wherein:

FIGURE 1 is a schematic diagram illustrating the separation of gas in accordance with the invention and showing a cross sectional view, with part broken away, of a portion of a membrane used in the invention;

FIGURE 2 is an elevational full section view of a gaseous diffusion cell constructed in accordance with the invention; and FIGURE 3 is an exploded view, in perspective, of the gaseous diffusion cell of FIGURE 2.

The invention comprises a method and apparatus for separating a mixture of at least two gases in which at least one of the gases has a substantially higher permeability constant in a particular cellulosic ether or ester than the other gas or gases in the mixture. A suitably freeze-dried or solvent exchange-dried dual layer membrane comprised of the particular cellulosic ether or ester is supported for diffusing gas therethrough. One of the layers of the membrane is porous and the other layer is nonporous and is preferably less than one micron thick. The gaseous mixture is conducted to one side of the membrane at a pressure in the gaseous mixture which is sufficient to cause diffusion of the one gas through the membrane at a predetermined rate. The desired end product is collected either by collecting the one gas which has diffused through the membrane barrier, or by collecting the resulting mixture out of which the one gas has been separated. If desired, and if the membrane has suitable permeability constants, two or more gases may be diffused through the membrane to recover a submixture from a mixture, or to remove a submixture from the mixture.

The diffusion of gases through nonporous membranes involves a relatively complex permeation process as opposed to the characteristics of gaseous diffusion through porous membranes. In nonporous membranes, the gas first dissolves in the membrane at the surface thereof, then proceeds through the membrane by a diffusion process which obeys certain known laws, and then evaporates from the opposite surface of the membrane. The most significant step in the permeation process just described, with respect to the quantity of gas which passes through the membrane, is the diffusion of the gas through the membrane between the respective surfaces. Under steady state conditions, this diffusion step will obey the following relationship:

$$R = PA\frac{(P_H - P_L)}{t}$$

where R is the quantity of gas passing through the membrane per unit of time, A is the effective area of the membrane, P is the permeability constant of the membrane for the particular gas, $P_H$ is the partial pressure of the gas on the high pressure side of the membrane, $P_L$ is the partial pressure of the gas on the low pressure side of the membrane, and $t$ is effective thickness of the membrane.

The permeability constant (P) is generally expressed as follows:

$$\frac{cm.^3 \ (STP) \ cm.}{sec. \ cm.^2 \ cm. \ Hg}$$

The permeability constant of a particular gas will ordinarily increase exponentially with temperature, and the ratio of the permeability constants of two gases is known as the separation factor and provides a comparative indication of the ability of a particular membrane to select one of the gases. Generally speaking, the permeabiilty constant or permeability of a particular gas in a membrane will be greater for that gas in a mixture which has the smaller size molecules. There are, however, certain exceptions to this general rule depending upon the material of which the membrane is comprised.

In connection with the present invention, it has been found that membranes comprised of cellulosic ethers or esters may be fabricated into nonporous membranes of very small effective thickness. Such membranes possess substantially different permeability constants for a number of gases and provide such significantly high permeation rates as to be of possible use in many commercially promising applications.

The cellulosic ester, cellulose acetate, is utilized as a membrane material in the invention for separating certain gases, and has proved to be of significant value when the membrane is prepared in a manner to have a very small effective thickness, as described below. For example, the invention has achieved relatively high rates of separation of helium from natural gas by using such a membrane of cellulose acetate. As a temperature of 24° C., the permeability constant for helium in cellulose acetate was found to be about $1.4 \times 10^{-9}$, whereas the permeability constant for methane (a primary constituent of natural gas) was found to be about $4.3 \times 10^{-11}$. This corresponds to a separation factor of about 33, indicating that the rate of passage of helium through a membrane of cellulose acetate will be approximately 33 times that of methane. The permeability constant for nitrogen (another primary constituent of natural gas) was found to be about $3.5 \times 10^{-11}$, and the separation factor of helium with respect to nitrogen is therefore about 40. Separation factors for helium with respect to other gases normally present in natural gas are correspondingly high. Thus, cellulose acetate exhibits an extraordinary ability for the selective recovery of helium from natural gas.

From the previously discussed formula, it will be noted that, for a given set of conditions, the smaller the effective membrane thickness ($t$), the higher the total rate of gas diffusion through the membrane will be. Obviously then, the need for relatively high recovery rates in commercial applications of gas separation would dictate that the membrane used be as thin as possible. As a practical matter, however, the thinness of a membrane is limited by the necessity that the membrane be free from defects, such as pinholes, and that the membrane have some inherent structural strength because of the pressure to which it is subjected.

The invention contemplates the utilization of a dual layer membrane 10, the cross section of which is illustrated in FIGURE 1. The membrane is comprised of a first layer 11 of a thickness $t_1$ and a second much thinner layer 12 of a thickness of $t_2$. The thick layer 11 is porous to a degree that presents a negligible impedence to the flow of gas therethrough. The thick layer 11 provides support for the thin layer 12. The thin layer is nonporous and constitutes the only effective diffusion barrier to the flow of gas. It is through this thin layer that the gas diffuses according to the equation set forth above in connection with nonporous membranes. As will be explained subsequently, much thinner layers such as layer 12 may be formed in a dual layer membrane than are obtainable in single layer membranes.

The dimension $t_1$ should be sufficient that the thick layer 11 provides some support for the thin layer 12. As mentioned before, the thick layer has substantially no effect on the flow of gas therethrough from the standpoint of selective diffusion. A satisfactory size for the dimension $t_1$ would be in the range of 10 to 100 microns. Additional thickness beyond the 100 microns for $t_1$ would not provide any significant advantage, but would probably not detrimentally affect the process either. Membranes thicker than about 1 mm. would probably not be used.

A generally satisfactory range for the dimension $t_2$ would be from about 1/10 of a micron to approximately 1 micron. This thickness is important since it is the effective thickness of the membrane in the diffusion process. It will therefore have an inverse effect on the diffusion rate, as may be seen from the previously discussed formula where the thickness $t_1$ is the equivalent of $t$ in the equation.

The dual layer membrane is used in the invention in a substantially dry condition. The dry membranes are prepared from wet membranes of a type useful in connection with the demineralization of saline waters, such as sea water. Such wet membranes are sometimes referred to as osmotic membranes, and processes for producing such membranes are disclosed in U.S. Department of the Interior, Office of Saline Water, Bulletins PB 166395 and PB 181571, available from the U.S. Dept. of Commerce. These bulletins describe the formation of an osmotic membrane by dissolving a film forming cellulosic ester, such as cellulose acetate, plus an aqueous solution of a salt, such as sodium or magnesium perchlorate, in an organic solvent, such as acetone, methyl ethyl ketone, ethyl alcohol, or methyl alcohol. A thin layer of this solution is cast on a flat surface to form a film of substantially uniform thickness at a temperature below room temperature. A portion of the organic solvent is evaporated, also at a temperature below room temperature. The cast layer is then immersed in ice water to remove the salt and complete the setup of the membrane. The membrane is heated prior to its use in demineralization processes to complete its osmotic organization, but care is taken to avoid drying of the membrane. The demineralization process in connection with which these membranes are used is known as reverse osmosis.

It has been found that membranes formed by the above process are of the cross sectional structure illustrated in FIGURE 1. It is believed that the relatively thin layer 12 of the dual layer membrane 10 is formed by the evaporation of a portion of the organic solvent near the upper surface of the cast membrane at a temperature below room temperature. The time allowed for the evaporation of the organic solvent influences the resultant thickness of the relatively thin layer of the membrane. For many purposes evaporation for about a minute is satisfactory although somewhat longer times may be used. After immersion in water to complete the set-up of the membrane, it is ready for use in a demineralization process.

If dried in air without special precautions, the membrane becomes distorted and brittle. Two methods have been found which are suitable for drying the membrane and thus preparing it for use in gas separation.

Freeze-drying of the membrane in a wet condition is disclosed in pending patent application Ser. No. 472,304, filed July 15, 1965, in the name of Robert L. Riley and assigned to the assignee of the present application. The freeze-dry the wet dual layer membrane, it is frozen in order to change the molecules of water to crystals of ice. Although it is preferred to freeze the membrane quickly so that the ice crystals which form are quite small, slower freezing processes may also be used. The membrane may be frozen by immersion in a liquified gas which is nonreactive with the membrane. Quick freezing is conveniently carried out in this manner. In general, any relatively inert gas may be used, such as nitrogen, argon or helium. Nonreactive hydrocarbons, such as isopentane, are likewise considered suitable.

If, instead of immersing the membrane in liquified gas, a cryostat is used, the cryostat is preferably precooled to minimize the time necessary to freeze the water associated with the membrane. The cryostat is preferably operated at about −45° C., although higher temperatures may be employed. The membrane is held within the cryostat for a period of time sufficient to assure that all of the water has been frozen to ice crystals.

After freezing, the membrane is transferred while the water is in the frozen state to a cryostatic vacuum chamber. Although any suitable cryostatic vacuum chamber which is maintained at a temperature below 0° C. may be used, a chamber which has been precooled to about −15° C. is preferably employed. This temperature is maintained throughout the next step. A vacuum is drawn upon this chamber and held for a sufficient period of time to remove substantially all of the water by sublimation of the ice crystals to water vapor. Preferably, at least about 99 percent of the water is removed, that is, of the water exclusive of any water which may be chemically bound to the cellulosic ether or ester.

Times, temperatures, and amounts of vacuum such as are known in the art of freeze-drying are used to complete the removal of the water by sublimation. For example, at a temperature of about −15° C. and a pressure of about 0.1 mm. of mercury, a time period of about 16 hours is sufficient to complete the desired water removal. Obviously, other combinations of temperature, vacuum, and time may be used which will produce equivalent results. To assure complete removal of water, the temperature of the vacuum chamber may be raised to about 25° C. and vacuum pumping continued for about 1 hour. Measurement of the physical characteristics of the membrane before and after freeze-drying shows that there is no change in the total thickness of the membrane, within tolerances of about 1 micron.

Although it is believed that the freeze-drying process alone substantially organizes the osmotic membrane structure in generally the same manner as does the heat-treating step set forth in the two previously mentioned O.S.W. bulletins, in preparing membrances for use in gas separation methods, the wet membranes are preferably heat-treated prior to freeze-drying. Heat-treatment may be carried out, for example, for about 30 minutes in a water bath at about 80° C.

Alternatively, a method of drying in which a solvent exchange technique is employed may be substituted for the freeze-drying method. The specific objective in this method of drying is to replace the water in the membrane by another solvent, either directly or in multiple steps, so that air drying of the final solvent does not cause shrinkage or brittleness of the membrane. Suitable alcohols and other organic solvents having three basic characteristics may be utilized, i.e., (1) they are able to dissolve some water, (2) they do not attack the membrane, and (3) they have a fair vapor pressure.

In the solvent exchange technique, the water may first be displaced by isopropyl alcohol which in turn is displaced with toluene. Subsequent evaporation of the toluene gives a dry membrane very similar to that which is obtained by freeze-drying. While simple room temperature water evaporation yields a wholly unsuitable membrane because of shrinkage of the porous layer, room temperature evaporation of liquids such as toluene cause very little shrinkage and give a dry membrane with gas permeation properties that are within a factor of two of freeze-dried material.

In the solvent displacement method employed, the heat-treated membrane is blotted with absorbent tissue to remove the extraneous water from its surfaces. It is then immersed in isopropyl alcohol for half an hour in order to replace the water with alcohol. Without allowing the alcohol to evaporate, the membrane is transferred and immersed in toluene for several hours. These steps, all carried out at room temperature, provide a membrane whose porous structure is now filled with toluene. The membrane is then exposed to the open air so that the toluene may be allowed to evaporate in the course of several hours. The membrane may be kept flat between paper toweling during evaporation of the toluene.

It is believed that a combination of solvent exchange and freeze drying may provide a practical mtehod in commercial applications to obtain dry membranes without loss of physical characteristics.

In practicing the method of the invention, a dried membrane of the type discussed above is supported for gaseous diffusion, that is, supported so that the membrane constitutes a barrier to the flow of a gaseous mixture. The gaseous mixture from which a particular gas or gases are to be separated is established on one side of the membrane adjacent the thin nonporous layer (which is the left hand side in FIGURE 1) at a pressure which is sufficient to cause diffusion of the particular gas or gases through the membrane at the desired rate. Pressure differentials across the membrane will depend upon the economics of the process and should be high enough to cause a predetermined rate of diffusion which provides the recovery rate desired. In actual operation, such pressure differentials may be in the range of about 100 p.s.i. to about 1500 p.s.i. The pressure differentials may be higher if the membrane has sufficient strength or is supported adequately.

The gaseous mixture flows adjacent the relatively thin nonporous layer 12. The gas or gases for which the membrane is selectively permeable dissolve into the thin layer 12 at the adjacent surface (left-hand in FIGURE 1) and diffuse through the thin layer in accordance with the formula discussed previously. The operating temperature employed for the gaseous diffusion process of the invention depends upon the economics of the situation and upon the ambient temperature conditions. The diffusion characteristics of cellulose acetate are not susceptible to radical change with temperature within the range of interest, as is the case with some other plastics and resins, and consequently a minimum operating temperature is not rigidly limited. Thus, it may be economically advantageous to operate at room temperature. Although the permeability constants of most membranes increase with temperature, it is probably unnecessary to exceed an operating temperature of 100° C. when employing a celluloseacetate osmotic membrane. However, it may be possible to go to higher temperatures if circumstances so demand. The limiting upper temperature is considered to be that at which deterioration of the membrane occurs.

After diffusing through the relatively thin layer 12, the selected gas or gases evaporate from the opposite side and flow through the porous layer 11 which presents relatively little resistance to flow therethrough. Suitable means may be provided for collecting the gas which has permeated through the membrane. If the process is used for the purpose of removing an undesirable gas or gases from a mixture, the residual gas or gases on the high pressure side (left-hand side in FIGURE 1) of the membrane are collected. The constitution of the gaseous mixture on the high pressure side of the membrane of course varies as a selected gas passes through the membrane. This would result in some variation in the recovery rate of the gas passing through the membrane unless a flow of gaseous mixture on the high pressure side is established which is sufficient to maintain a generally constant mixture constitution on that side. In a situation where one of the desired products is the initial mixture with one or more gaseous components removed, it may be desirable to employ a relatively slower flow rate and/or to employ a series of separating apparatus each of which will further decrease the percentage composition of the gaseous components being removed. Moreover, even when the primary product is the permeated gas or gases, to obtain high purities, it may be desirable to have several diffusion stages.

Although the invention has application to the separation by gaseous diffusion of any gases for which the membrane provides suitable permeability constants, the separation of certain particular gases is recognized as presently having substantial commercial significance. Examples of such commercially significant applications of the invention include: the separation of helium from natural gas; the separation of helium from a mixture of about 80 percent helium and 20 percent residual gases, which is the type of mixture now being stored underground in depleted natural gas wells by the United States Bureau of Mines; the separation of hydrogen from a mixture of hydrogen and carbon monoxide, which is a by-product of coking and similar processes; and the separation of neon from a mixture of helium and neon.

Although it is considered that any suitable osmotic membranes having a very thin nonporous layer in combination with a relatively thick porous layer may be employed in the invention, it should be recognized that the permeation constants of different gases will vary when osmotic membranes made of different materials are used. As previously mentioned, suitable two-layer osmotic membranes are preferably produced in the manner set forth above, i.e., casting a fluid layer, evaporating from one surface of the layer, immersing in a water bath, and then freeze-drying or solvent exchange-drying the wet membrane.

It is presently preferred to use cellulose esters or ethers in order to cast suitable osmotic membranes for this purpose. Examples of particularly suitable cellulose esters and ethers include cellulose acetate, cellulose nitrate and cellulose ethyl ether (ethyl cellulose). Freeze-dried or solvent exchange-dried osmotic membranes made of cellulose acetate, especially cellulose containing about 40% by weight acetyl (based upon total weight of cellulose acetate), have permeation constants for various gases which are commercially attractive. The diffusion rates of particular gases, for example hydrogen, helium, and oxygen, through these cellulose acetate osmotic membranes are believed to exceed those which can be achieved using other gaseous diffusion membranes under similar operating conditions and product purity standards.

Apparatus constructed in accordance with the invention utilizes a dual layer nonporous membrane of the type discussed above. In supporting the membrane in a manner to permit gaseous diffusion, the apparatus should present the membrane surfaces to adequate quantities of the gas for dissolving gas at one surface of the relatively thin layer and evaporating gas from the opposite surface thereof. In addition to the form of a planer membrane configuration dividing two chambers, numerous other configurations may be devised including structures wherein the membrane is folded one or more times, or rolled in a manner to provide spiral chambers. In addition to the supporting means, the apparatus should provide means for presenting or establishing a gaseous mixture, from which a particular gas or gases are to be separated, at a given pressure on one side of the membrane. Furthermore, means should be provided for collecting the desired end product which, as pointed out above, may comprise the gas or gases which have diffused through the membrane, or may comprise the residual gas or gases on the high pressure side of the membrane, or may in some instances comprise both.

The particular configuration of the structure will probably depend upon the use to which the apparatus is to be put. High volume production, such as may be required in certain commercial applications, may necessitate complex folding or rolling arrangements for membrane support and may involve substantial membrane areas, for example, of the order of 1,000 square feet. On the other hand, laboratory size apparatus or apparatus for similar low volume uses may require only about 20 square centimeters of effective membrane area.

Referring particularly to FIGURES 2 and 3, a gaseous diffusion apparatus or cell 20 is illustrated. This cell may be utilized for testing and other laboratory purposes. A plurality of such cells may be grouped together for larger volume capacity or to achieve separation in successive stages. The cell 20 illustrated in FIGURES 2 and 3 comprises a housing consisting of an upper portion 21 bolted to a lower portion 22. Upper portion 21 has a central opening therein comprised of three sections of different diameters, 23, 24 and 25.

The membrane 10 is sandwiched between mating surfaces of the upper and lower housing portions 21 and 22 and extends across opening section 25. The periphery of the membrane 10 is sealed to the housing portions by a pair of O-rings 26 and 27. O-ring 27, which may be comprised of rubber, is disposed in an annular cavity 28 formed in the mating surface of housing portion 22. A central opening is provided in housing portion 22 and includes an upper section 29 and a lower section 31 of smaller diameter. O-ring 26, which may be made of a material such as polytetrafluoroethylene, rests on the shoulder between opening sections 29 and 31.

In order to provide support for the membrane 10 against pressure differentials existing thereacross, a porous steel backing plate 32 is disposed in opening section 25. A layer of filter paper 33 is disposed between membrane 10 and the porous steel backing plate 32 to prevent the membrane from being damaged by the end edges of the passages in the porous steel plate. O-ring 26 effects a seal at the periphery of the filter paper 33.

The gaseous mixture from which the permeated gas is to be separated enters the lower chamber formed by opening sections 29 and 31 through an inlet passageway 34 in housing portion 22. Gas leaves the lower chamber through an exit passage 35 in housing portion 22. Gas which diffuses through the nonporous membrane 10 passes through the filter paper 33 and through the porous steel backing plate 32 and enters the upper chamber comprised of opening sections 23 and 24. From there, it is removed and either collected or discarded as the case may be. Suitable means (not shown) is provided for pumping the gaseous mixture through passage 34 into the lower chamber and for restricting its flow from exit passage 35 to maintain the desired pressure and flow rate in the lower chamber. As previously mentioned, the pressure differential on opposite sides of the membrane 10 affects the diffusion rate of the particular gas through the membrane.

The following examples include detailed descriptions of processes which embody various features of the invention. It should be understood, however, that the following examples in no way limit the scope of the invention which is defined solely by the claims appearing at the end of this specification.

*Example I*

A casting solution is prepared of about 666 parts, by weight, of cellulose acetate dissolved in about 2,000 parts, by weight, of acetone. The cellulose acetate resin employed contains about 39.8% acetyl, based upon total weight of the cellulose acetate, the resin thus being primarily in the form of cellulose diacetate. About 33 parts, by weight, of magnesium perchlorate, a swelling agent, are dissolved in about 300 parts, by weight, of water. The two solutions are mixed, until a homogeneous appearing mixture is obtained, by placing the mixture in a suitable jar and rolling the jar on a jar mill. The final solution is cooled to a temperature of about $-10°$ C.

The casting solution is then cast upon a smooth flat surface so that a thin layer of uniform thickness is obtained. The casting operation is regulated so that the thickness of the resultant osmotic membrane is about 100 microns. The cast layer is permitted to remain in contact with the atmosphere for about one minute and is then immersed in water maintained at a temperature of about $1°$ C. The membrane is allowed to remain immersed in a water bath for a sufficient period to set-up and to remove any unevaporated acetone by diffusion into the water. Also, the swelling agent is substantially removed. Usually a few minutes time is sufficient; however, longer or shorter periods may be used if desired. The set-up membrane is then washed thoroughly in tap water. Heat treatment of the membrane is then carried out by immersion in a water bath which is heated to about $80°$ C. for about thirty minutes time. Under these circumstances an effective diffusion barrier of about 0.3 microns is obtained.

The heat-treated membrane is blotted with absorbent tissue to remove the extraneous water from its surfaces. It is then immersed in liquid isopentane at a temperature of about $-150°$ C. After about one minute in liquid isopentane, all the water within the membrane is changed to ice crystals. The frozen membrane is removed and placed in a precooled cryostatic vacuum chamber which is maintained at a temperature of about $-15°$ C. The chamber is rapidly evacuated to a pressure of about $10^{-4}$ mm. of mercury by a vacuum pump. The vacuum pump operates as necessary to maintain the chamber at this pressure. A vapor-removal system, such as a liquid nitrogen trap, is located adjacent the vacuum chamber to effect rapid drying of the frozen membrane. The frozen membrane is maintained in the chamber under this vacuum for about twenty-four hours. At the conclusion of this period, the chamber is warmed to about $25°$ C. After an hours at $10^{-4}$ mm. pressure and $25°$ C., the membrane is removed from the drying chamber. This freeze-dried membrane is then cut into a plurality of sample portions having dimensions which fit into a gas diffusion apparatus 20 such as illustrated in FIGURES 2 and 3.

One sample portion, Sample A, is installed in a diffusion apparatus 20. In the particular apparatus employed, a surface area of about 20 square centimeters of the membrane is exposed to the gaseous mixture which is fed into the diffusion apparatus 20. Natural gas is fed into the lower chamber of the apparatus through the inlet 34. The particular natural gas employed comprises about 2 mole percent helium, about 25 mole percent nitrogen, and about 66 mole percent methane, with the remainder including ethane, propane and various higher hydrocarbons. Operation is carried out at $23°$ C., and the pressure is regulated so that the pressure of the gas mixture in the lower chamber is about 1000 p.s.i.g. The pressure in the upper chamber is held at about 0.1 p.s.i.g. Natural gas is fed into the inlet at a sufficiently high rate that insignificant changes in its composition take place as a result of permeation of gas through the membrane The gaseous fraction which diffuses through the membrane 10 is removed from the apparatus via upper outlet 23 and is collected, measured, and tested. Under these conditions, for the membrane surface area of about 20 square centimeters, the recovery rate of diffused gas is about 0.25 cubic centimeters per second (STP). This gaseous fraction measures about 34 mole percent helium, about 47 mole percent methane, and about 14 mole percent nitrogen. From these results, the following permeability constants are calculated:

$$\text{helium}=1.4\times10^{-9}, \text{methane}=4.3\times10^{-11},$$

and nitrogen=$3.5\times10^{-11}$. The gas permeability constants are in units of the formula previously stated. The purity of the helium is considered commercially acceptable for a one-stage separation and may be increased by treatment in subsequent stages. The recovery rate of helium from the natural gas is considered to be easily competitive with the present commercial methods.

*Example II*

Another sample portion of the membrane made in Example I, Sample B, is installed in the diffusion apparatus 20. A mixture of crude helium comprising about 80 mole percent helium and about 20 mole percent other gases, primarily nitrogen with minor amounts of methane and oxygen, is fed into the lower chamber through the inlet 34 to establish a pressure of about 1000 p.s.i.g. in the lower chamber. Again the operation is carried out at $23°$ C., and the pressure in the upper chamber is maintained at about 0.1 p.s.i.g. The crude helium is fed at a sufficiently high rate that insignificant changes in its composition take place as a result of permeation of gas through the membrane.

The gaseous fraction which permeates through the membrane exits from the apparatus through the upper outlet 23 and is collected, measured and tested. Under these operating conditions, for an effective membrane surface area of about 20 square centimeters, about 4.6 cc. per second of gas (STP) are collected. Examination of the gas shows that it comprises about 99.4 percent helium, and about 0.6 percent nitrogen. From this data, the following permeability constants are calculated:

$$\text{helium}=1.4\times10^{-9} \text{ and nitrogen}=3.5\times10^{-11}.$$

The separation of helium accomplished is considered to be excellent, and the separation process is considered to be commerically competitive.

*Example III*

Another sample portion of the membrane made in Example 1, Sample C, is installed in the diffusion apparatus 20, and a mixture of about 50 mole percent hydrogen and about 50 mole percent carbon monoxide is fed into the lower chamber through the inlet 34. A pressure of about 1000 p.s.i.g. is maintained in the lower chamber and a pressure of about 0.1 p.s.i.g. is maintained in the upper chamber. The operation is carried on at 23° and a similarly high rate of gas mixture is fed through the inlet 34.

The gaseous fraction which diffuses through the membrane and exits from the apparatus via the outlet 23 is collected, measured, and tested. Under these conditions, about 2.6 cc. (STP) of gas per second is collected. Analysis shows that this gaseous fraction comprises about 96 percent hydrogen and about 4 percent carbon monoxide. The following permeability constants are calculated:

hydrogen=$1.2 \times 10^{-9}$; carbon monoxide=$4.8 \times 10^{-11}$.

The separation achieved is considered excellent and is considered to have good commercial potentiality.

*Example IV*

Another sample portion of the membrane made in Example I, Sample D, is installed in the diffusion apparatus 20, and a mixture of about 22 mole percent helium and about 78 mole percent neon is fed into the lower chamber through the inlet 34 so as to create a pressure in the lower chamber of about 1000 p.s.i.g. The operation is carried on at 23°, and the pressure in the upper chamber is maintained at about 0.1 p.s.i.g. The input flow of the helium neon mixture is maintained at a sufficiently high rate that insignificant changes in its composition take place as a result of permeation of gas through the membrane.

The gaseous fraction which diffuses through the membrane is removed from the apparatus via the upper outlet 23 and is collected, measured, and analyzed. Under these operating conditions, about 2.1 per second (STP) of gas is collected. Analysis of the diffused gas shows that it measures about 59 percent helium and about 41 percent neon. From this data the following permeability constants are calculated: neon=$2.8 \times 10^{-10}$; helium=$1.0 \times 10^{-9}$. The separation which is achieved is considered to be excellent for a one-stage separation and further separation may be easily achieved by subsequent stages. This separation is considered to be superior economically to other commercially available separation methods for helium and neon.

*Example V*

Another sample portion of the membrane made in Example 1, Sample E, is installed in the diffusion apparatus 20 and air, a mixture of about 80 mole percent nitrogen and 20 mole percent oxygen is fed into the lower chamber through the inlet 34 so as to create a pressure in the lower chamber of about 1000 p.s.i.g. The operation is carried on at 23° C. temperature, and the pressure in the upper chamber is maintained at about 0.1 p.s.i.g. The input flow of the air is maintained at a sufficiently high rate that insignificant changes in its composition take place as a result of permeation of gas through the membrane.

The gaseous fraction which diffuses through the membrane is removed from the apparatus via the upper outlet 23 and is collected, measured and tested. Under these operating conditions, about 0.18 cm.³ (STP)/second of 61 mole percent nitrogen and 39 mole percent oxygen is obtained. From this data, the following permeability constants are calculated: nitrogen $3.5 \times 10^{-11}$; oxygen $8.9 \times 10^{-10}$. This is a rate of flow and single stage enrichment in oxygen that is considered economically superior to other commercially available separation methods.

It may therefore be seen that the invention provides an improved method and apparatus for gas separation by diffusion through nonporous membranes. The selectivity of the method and apparatus to particular gases and the recovery rates of such gases are sufficient to suggest use of the invention in many commercial areas. Various modifications and embodiments of the invention other than those specifically discussed above will be apparent to those skilled in the art, and such other modifications and embodiments are intended to fall within the scope of the appended claims.

Various of the features of the invention are set forth in the following claims.

What is claimed is:

1. A method for separating a first gas from a mixture including first and second gases, which method comprises supporting for gaseous diffusion therethrough a thin dry dual layer cellulose acetate osmotic membrane having one porous layer and one nonporous layer, said nonporous layer being substantially thinner than said porous layer, said osmotic membrane having a substantially higher permeability constant for the first gas than for the second gas, establishing the gaseous mixture on one side of the membrane at a pressure sufficient to cause diffusion of the first gas through the membrane at a predetermined rate, and collecting the desired product as the first gas diffuses through the membrane.

2. A method in accordance with claim 1 wherein said osmotic membrane has been freeze-dried.

3. A method in accordance with claim 1 wherein said membrane has been dried by solvent exchange technique.

4. A method in accordance with claim 1 which is carried out at room temperature.

5. A method in accordance with claim 1 wherein the pressure of the gaseous mixture is between 100 and 1500 p.s.i.

6. A method in accordance with claim 1 wherein said gaseous mixture is established adjacent said nonporous layer of said membrane.

7. A method in accordance with claim 6 wherein said first gas is helium and said second gas is nitrogen.

8. A method in accordance with claim 6 wherein said first gas is hydrogen and said second gas is carbon monoxide.

9. A method in accordance with claim 6 wherein the first gas is helium and said second gas is methane.

10. A method in accordance with claim 6 wherein said first gas is helium and said second gas is neon.

11. A method in accordance with claim 6 wherein said first gas is oxygen and second gas is nitrogen.

12. Apparatus for separating a first gas from a gaseous mixture including first and second gases, which apparatus comprises in combination, a thin dry duel layer cellulose acetate osmotic membrane having a substantially higher permeability constant for the first gas than for the second gas, one of the layers of said membrane being porous and the other being nonporous, said nonporous layer being substantially thinner than said porous layer, means for supporting said membrane for gaseous diffusion therethrough, means for supplying the gaseous mixture to one side of said membrane at a pressure sufficient to cause diffusion of the first gas through said membrane at a predetermined rate, and means for collecting the desired product as the first gas diffuses through said membrane.

13. Apparatus in accordance with claim 12 wherein said osmotic membrane has been freeze-dried.

14. Apparatus in accordance with claim 12 wherein said osmotic membrane has been dried by solvent exchange technique.

15. Apparatus in accordance with claim 12 wherein said supply means supplies the gaseous mixture to the side of said membrane adjacent said nonporous layer.

16. Apparatus in accordance with claim 12 wherein said cellulose acetate contains about 40% by weight acetyl, based upon total weight of cellulose acetate.

17. Apparatus in accordance with claim 12 wherein said nonporous layer of said membrane is no more than about one micron thick.

References Cited

UNITED STATES PATENTS

| | | | |
|---|---|---|---|
| 1,421,341 | 6/1922 | Zsigmond et al. | 210—321 X |
| 1,885,393 | 11/1932 | Van Schaack | 210—321 X |
| 2,540,151 | 2/1951 | Weller et al. | 55—16 |
| 2,540,152 | 2/1951 | Weller | 55—16 |
| 2,930,754 | 3/1960 | Stucke | 210—321 X |
| 2,966,235 | 12/1960 | Kammermeyer | 55—16 |
| 3,133,132 | 5/1964 | Loeb et al. | |
| 3,172,741 | 3/1965 | Joller | 55—16 |

REUBEN, FRIEDMAN, *Primary Examiner.*

J. ADEE, *Assistant Examiner.*

U.S. Cl. X.R.

55—158

UNITED STATES PATENT OFFICE
CERTIFICATE OF CORRECTION

Patent No. 3,415,038                      December 10, 1968

Ulrich Merten et al.

It is certified that error appears in the above identified patent and that said Letters Patent are hereby corrected as shown below:

Column 5, line 46, "The" should read -- To --. Column 6, line 64, "mtehod" should read -- method --. Column 7, line 28, "celluloseacetate" should read -- cellulose acetate --. Column 11, line 48, "1.0" should read -- 1.4 --.

Signed and sealed this 10th day of March 1970.

(SEAL)
Attest:

Edward M. Fletcher, Jr.                    WILLIAM E. SCHUYLER, JR.

Attesting Officer                            Commissioner of Patents